March 1, 1960   D. A. JONES   2,926,468
INCREMENTAL LINEAR ACTUATOR FOR PREVENTING RETROGRADE MOTION
Filed Feb. 6, 1959   2 Sheets-Sheet 1
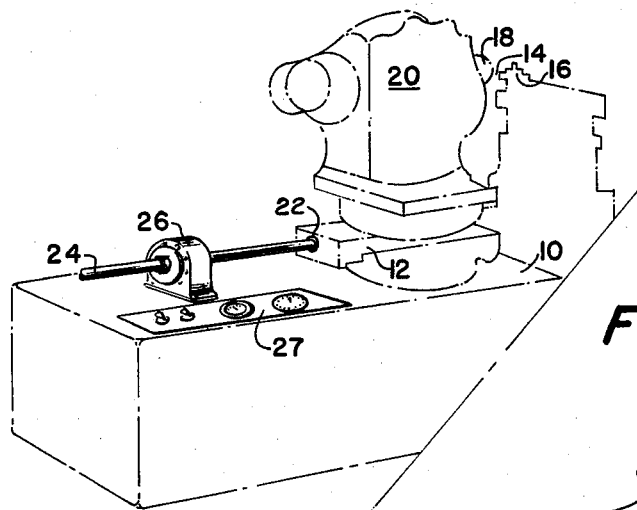
Fig. 1
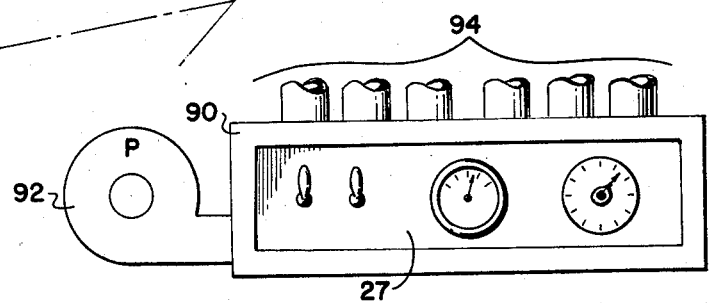
Fig. 3
| ROD MOVEMENT | PORTS | | | | | |
|---|---|---|---|---|---|---|
| ROD LEFT | 35 | 37 | 38 | 40 | 39 | 41 |
| 1 | | ✕ | | | ✕ | ✕ |
| 2 | ✕ | ✕ | | | ✕ | |
| 3 | ✕ | | | | ✕ | |
| 4 | ✕ | | | ✕ | ✕ | |
| 5 | | | | ✕ | ✕ | |
| 6 | | | | ✕ | ✕ | ✕ |
| | | | | | | |
| ROD RIGHT | | | | | | |
| 1 | | | ✕ | ✕ | | ✕ |
| 2 | | ✕ | ✕ | ✕ | | |
| 3 | | ✕ | ✕ | | | |
| 4 | ✕ | ✕ | ✕ | | | |
| 5 | ✕ | ✕ | | | | |
| 6 | ✕ | ✕ | | | | ✕ |
Fig. 4
DERRICK A. JONES,
INVENTOR
BY Homer R. Montague
ATTORNEY

United States Patent Office 2,926,468
Patented Mar. 1, 1960

2,926,468

INCREMENTAL LINEAR ACTUATOR FOR PRE-VENTING RETROGRADE MOTION

Derrick A. Jones, Halesite, N.Y., assignor to Fairchild Camera and Instrument Corporation, a corporation of Delaware Application February 6, 1959, Serial No. 791,771

4 Claims. (Cl. 51—165)

This invention pertains generally to devices adapted to impart incremental linear movements to a movable element of an instrument or a machine, such as a machine tool or the like, and more particularly to such devices wherein it is desired to prevent retrograde motion between the relatively movable parts.

In many of the mechanical arts there is a requirement to move one element relative to another in very small and very accurately controlled incremental steps. Exemplary of such arts is the machine tool field, wherein a movable bed or the like, which may support either the workpiece or the tool which is to perform some desired operation on such workpiece, is required to be advanced in either of two opposite directions in incremental steps as the workpiece is bored, ground or otherwise operated on by the bit, grinding wheel or the like of the particular machine tool on which the work is mounted. For the most part, such machine tools are required to operate under rather strict conditions, and in precision work the tolerances must be very close. In order to be able to produce a finished product within the close tolerances which have become commonplace today, it is obviously necessary to be able to control, to a very high degree, the position of the workpiece relative to the bit or other working element of the machine tool. This places some rather severe requirements on the mechanism which is to be employed to produce the relative movement between the movable bed of the machine tool and the base or other stationary portion thereof. Such mechanism must both be powerful enough to be able to drive the movable bed or the like in a positive manner and at the same time be capable of being controlled to a very fine degree as to the amplitude of the incremental movements imparted.

In the past it has been customary to provide a lead screw or the like as the sole drive element between the base of a machine tool and the movable bed thereof, the fineness of the pitch of the screw thread determining in part the accuracy obtainable in achieving a precise relative positioning of the movable element with respect to the stationary. Even where a lead screw is manufactured with a sufficiently fine and accurate pitch in the thread thereof, usually at a relatively great cost, to achieve precision operation in the utilization of the machine tool in which it is incorporated, the accuracy of such operation is always impaired by small unavoidable irregularities in the screw, and almost invariably as the machine is used for a period of time the screw thread becomes worn, usually unevenly, and most of the original precision is lost.

In reference to the devices of the prior art in the general field of incremental relative movement between elements of a machine, instrument or the like, it should be noted that in addition to the lead screw devices referred to above there are several other presently known devices in the prior art whereby incremental relative motion between machine parts or the like may be achieved with one or more attendant advantages in comparison to the operation provided by the use of a lead screw alone. One of the early steps taken to obtain improved performance over that provided by the use of lead screw devices was the introduction of a magnetostrictive rod as the driving element, with magnetic means associated therewith to encompass at least a portion of such magnetostrictive rod in a magnetic field of a desired strength at controlled times to effect elongation of same upon such magnetic energization, in accordance with the well known magnetostrictive effect wherein the magnetostrictive element undergoes an elongation when it is subjected to a magnetic field. By providing a pair of spaced clamping means, whereby respective points along the magnetostrictive rod are selectively clamped to another member, usually in a desired sequence, relative incremental motion may be achieved between the magnetostrictive rod and such other member which the clamping means grip.

In another form of means for achieving the desired relative incremental motion between machine parts or the like, the drive element is in the form of a pair of gripping or clamping members connected together by an expandable element which may be in the nature of a pneumatic or hydraulic bellows or the like. Upon the introduction of a suitable pressure within the bellows or other expandable element, the two clamping means undergo relative motion, usually a greater separation where the pressure in the bellows is increased, and selective sequential energization of the clamping means in association with a secondary member provides a relative motion between such member and the unit made up of the bellows and the two clamping means.

Still another modification of the driving element of the prior art devices is exemplified by an incremental feed device having a drive rod with a pressure chamber or the like therein, along with a pair of gripping or clamping elements generally analogous to those just mentioned. A change in the fluid pressure that is supplied to the pressure chamber causes a change in the axial dimension of the drive rod, with the proper sequential operation of the clamping means affording the desired relative incremental motion between the drive rod and another member which is gripped by the clamping means.

Where precision is a foremost requirement, the aforementioned devices of the prior art have at least one common disadvantage, viz., before the driving force is applied (whether it be the magnetite field in the case of the magnetostrictive rod, or the fluid pressure in the case of the bellows or the like) to drive the movable element in the desired direction through an incremental distance, the movable element usually undergoes a small retrograde movement before the driving force can actually produce movement in the desired direction. This is especially true where the movable element is under a mechanical load directed in a sense opposite to the direction of desired incremental movement.

The reason for this retrograde movement or back-sliding is clearly seen in connection with the bellows type actuator of the prior art. In such a device, the relatively movable elements are connected together through the bellows and one or more of the clamps in a series arrangement; the clamping members are respectively connected to or are at least supported by one or the other of the two relatively movable elements, and the bellows interconnects the two clamps. Alternatively, one of the elements is clamped by one of the clamps, and the other is secured to the bellows directly. Thus, there is no positive stop or rest means provided between these two relatively movable members whereby the one may be securely supported against retrograde movement when one of the clamping members is released in preparation for an incremental movement in the desired direction.

When such clamping member is released, the flexible material of the bellows itself serves as the mutual support between the two relatively movable elements unless fluid pressure has already been applied to the bellows. Even where pressure is applied to the bellows in advance of the release of such clamping means, it is difficult to apply a sufficient pressure to preclude retrograde motion while still controlling the magnitude of the pressure for achieving an accurately controlled incremental movement in the desired direction.

It is accordingly a primary object of the present invention to provide an actuating mechanism for effecting small incremental movements of one machine part or the like relative to another, wherein such parts may be firmly supported against relative movement in one direction when an increment of movement is being initiated in the opposite direction.

Another object of the present invention is to provide an actuating mechanism for effecting small incremental movements of one machine part or the like relative to another in either of two opposite directions, wherein such parts may be firmly supported against movement in either of such directions when an increment of movement is being initiated in the other direction.

In accordance with a preferred embodiment of the present invention, the above and other objects are achieved by means of a rigid annular member mounted on one of the elements between which the incremental relative motion is to take place, with the elongate other element passing through the central portion of the rigid member in a loose or sliding fit. An annular driving member also encircles the elongate element and is secured at its outer periphery to the outer periphery of the rigid member. A first clamping means is connected to the rigid member, and a second clamping member is connected to the driving plate or member at the inner periphery thereof. Means are provided for pivotally moving the driving member with respect to the rigid member, with the outer peripheries thereof serving as the point of pivotal attachment therebetween. Control means are provided for selectively actuating the clamping members and the pivotal driving member in sequence in order to "walk" the actuating device and the movable element attached thereto along the elongate element in a given direction. Where it is desired to provide incremental movements in either of the two opposite directions along the length of the elongate member, a second driving plate is provided on the side of the rigid member opposite to that of the first driving member. The first clamping means is connected to the inner periphery of this second annular driving member rather than to the rigid member as before. In addition, means may be provided for actively maintaining the driving plates in contiguous relation to the respective faces of the rigid member, the normal position of the driving members when not actuated, until one or the other of the driving members is actuated to pivot it away from the central portion of the rigid member.

With the above considerations and objects in mind, the invention itself will now be described in connection with a preferred embodiment thereof given by way of example and not of limitation, and with reference to the accompanying drawings, in which:

Fig. 1 is a perspective view, partially in phantom, of a machine tool incorporating a preferred form of the apparatus of the present invention.

Fig. 3 is a schematic representation of exemplary means for applying driving power to the apparatus of the invention.

Fig. 4 is a chart indicating a preferrd operating sequence for the application of power to the apparatus of the invention.

Figure 2:
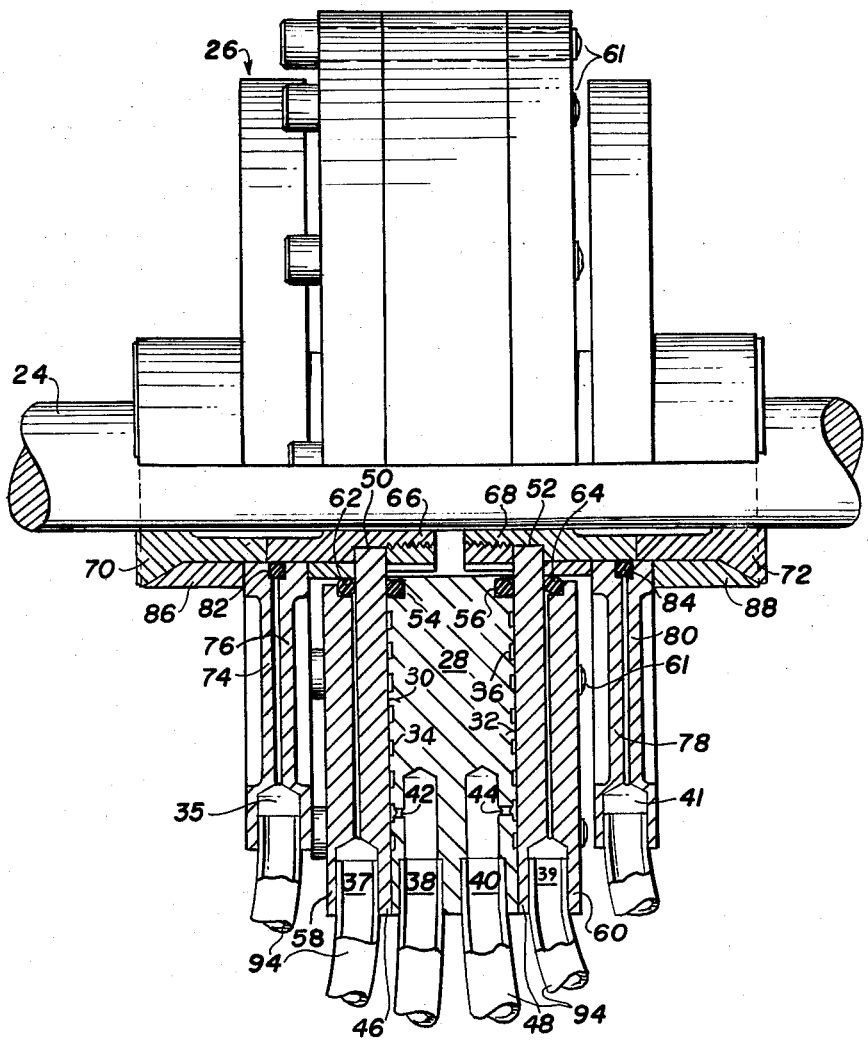
Fig. 2 is a side elevation view of a preferred form of the apparatus of the invention with portions thereof being broken away to facilitate description.

Referring now to Fig. 1, a machine tool is shown in phantom lines, having a base member 10 and a bed 12 relatively movable with respect thereto. A workpiece 14 is supported on a workholder 16 which is mounted on base 10, and a grinding wheel 18 is carried by the movable bed 12, along with suitable means indicated generally at 20 for causing the necessary rotation of grinding wheel 18. As is known to those skilled in the art, means are usually provided between the movable bed 12 and equipment carried thereby to rotate such equipment on the bed so as to adjust the position of the grinding wheel 18 with respect to workpiece 14. Such rotary mounting means form no part of the present invention, and are therefore not shown. The present invention is concerned with the means for causing relative linear movement between grinding wheel 18 and the workpiece 14, such motion being accomplished by relative linear motion between bed 12 and base 10.

Attached securely to the movable bed 12 by a suitable clamping flange or the like as indicated at 22, is an elongate drive rod or bar 24. As may be seen in the drawing, rod 24 extends through a housing indicated at 26 which generally defines the apparatus of the present invention, which apparatus will be described in detail in connection with subsequent figures of the drawings. Base 10 is provided with a control panel 27, which includes a plurality of control knobs, indicators and the like as will be better understood in connection with the description of an exemplary form of the control system for the elements in the housing 26, given in the description of subsequent drawings.

Turning now to the details of the structure of a preferred form of the apparatus of the present invention as shown in Fig. 2, it may be seen that the housing 26 is in reality a plurality of interconnected annular elements through the central aligned apertures of which passes the elongate rod 24. The lower portion of the near side of housing 26 has been broken away to facilitate the following description of the parts therein. A central annular member 28 of some suitably rigid material is the main structural member of the unit, with a portion of the periphery thereof being secured to base 10 of the machine tool as indicated in a general manner in Fig. 1. Since member 28 is rigid and is secured to the base 10 of the machine tool, either or both of these elements may be referred to as a reference member in a statement of the motion of the elongate rod 24 relative thereto.

The opposite faces 30 and 32 of rigid member 28 are substantially perpendicular to the axis of rod 24, and each is provided with a plurality of interconnected grooves indicated at 34 and 36 on the two respective faces. No particular pattern is required of these grooves in the respective faces, it being required that they merely be interconnected and that they cover a substantial portion of each face of member 28, so that fluid pressure applied to the ports 38 and 40 and transmitted through passages 42 and 44 is introduced in a reasonably uniform manner between each of the respective faces of member 28 and the adjacent face of the driving plates 46 and 48, respectively.

Annular driving plates 46 and 48 are respectively secured around their peripheries to the periphery of the adjacent face of the rigid central member 28, but the driving plates are each flexible to a significant degree so that the central portions thereof near the respective inner peripheries 50 and 52 are free to move through limited excursions in a direction substantially parallel to the axis of the elongate rod 24. Stated in another manner, the central portions of the two annular driving plates 46 and 48 may be bowed away from the normal planar state. In order that fluid pressure introduced into the grooved areas of the opposing faces may cause such bowing of either or both the driving plates, such plates are hermetically sealed to the central member 28 both at the outer peripheral connection therebetween and by means of the respective annular sealing rings 54 and 56 which engage and extend between the driving plates and the respective adjacent face of member 28 near the inner peripheries thereof. These seals are maintained, of course, irrespective of the movement of the central portions of the two driving plates.

The outermost elements of the central unit of the apparatus shown in Fig. 2 are a pair of rigid annular members 58 and 60, the outer peripheries of which are respectively secured to the outer peripheries of the driving plates 46 and 48. One convenient manner of securing together the outer peripheries of the members 28, 46, 48, 58 and 60 is shown in Fig. 2, wherein a plurality of bolts 61 or the like pass through such outer peripheries and are secured thereto by nuts or other threaded fasteners. In order to provide the required hermetic sealing between these several members at the outer peripheries thereof, suitable sealing materials may be placed on the contiguous faces thereof where the clamping is effected by such bolts. In addition to the aforementioned seals which are effected between the central member 28 and the adjacent plates 46 and 48, similar seals must exist between the outer faces of driving plates 46 and 48 and the respective members 58 and 60. Also, a second pair of annular sealing rings 62 and 64 are employed to form hermetically sealed chambers between members 46 and 58 and members 48 and 60, respectively. These sealing rings 62 and 64 engage and extend between the adjacent faces of these respective members near the inner peripheries thereof. The last-mentioned annular members 58 and 60 are rigid and thus do not partake of the bowing action performd by the driving plates 46 and 48. In this manner, the two driving plates are contained between respective pairs of rigid members, being mounted for limited pivotal motion therebetween.

At the inner or central portions 50 and 52 of the respective driving plates 46 and 48 are mounted cylindrical motion-transmitting members 66 and 68, respectively, each fitting over the elongate rod 24 in a loose or sliding fit. These cylindrical members are securely mounted on their respective driving plates so as to move with the central portions thereof. The outer ends of these members 66 and 68 carry respective split collets 70 and 72 which encircle the elongate rod 24. The split collets are constrained to move along the length of the rod 24 with the respective cylindrical members 66 and 68, but are free for motion in a direction radial of the elongate rod 24 so as either to grip the same or slide loosely thereon.

Cylindrical driving members 66 and 68 also carry respective clamp actuating units thereon, each consisting of an actuator unit and a camming sleeve. In the preferred form of the apparatus shown in Fig. 2, the actuator units are shown as each including a pair of annular plates 74, 76 and 78, 80. Each pair of plates are secured together in an hermetic seal at the external peripheries thereof, and the fluid chamber formed between the paired plates is sealed at the inner peripheries thereof by means of respective annular sealing rings 82 and 84, which engage and extend between the adjacent faces of the respective pairs of plates. The inner plates 76 and 78 are secured to and are carried by the cylindrical drive members 66 and 68, respectively, and the inner annular peripheries of the outer plates 74 and 80 are free for movement in a direction substantially parallel to the axis of the elongate rod 24. Such movement lengthwise of the elongate central rod causes similar movement of the camming sleeves 86 and 88, which respectively abut the outer faces of the plates 74 and 80. The cam surfaces of the sleeves 86 and 88 bear against cooperating surfaces on the respective collets 70 and 72, whereby the collets are forced inwardly to grip the elongate rod 24 when the cam members 86 or 88 are urged outwardly from the actuator unit.

In order to achieve the desired incremental motion of the rod 24 in either direction with respect to the stationary member 28, it is necessary to apply fluid pressure to the respective chambers between the several annular plates in a proper sequence. Fig. 3 shows in schematic form an exemplary fluid supply system for achieving this result. A control unit 90 with control panel 27 thereon is shown connected to a suitable source of fluid pressure 92. A plurality of output conduits 94 are provided for connection to respective ones of the several fluid ports 35, 37, 38, 39, 40 and 41 shown in Fig. 2. Means are provided within the housing 90 for connecting the fluid pressure source 92 to one or more of the output conduits 94 in accordance with the sequence necessary to achieve the desired incremental motion of elongate rod 24, as will be explained in detail in connection with Fig. 4. While the control means included within housing 90 might merely be an appropriate number of manually operated valves or the like, it will generaly be preferable to employ an automatic programming means of any suitable type for contro'ling the application of the fluid pressure to the several lines for transmission to the several fluid chambers in the actuator unit. Such automatic programming means may be any of several types presently available, such as a plurality of electromagnetically operated valves under the control of a corresponding plurality of cam operated switches which are operated by cams mounted on a common rotary shaft or the like. The particular form of the control means employed in this connection is not a part of the inventive concept of the present invention, and any means which will serve the purposes of a given installation may be employed. As stated above, the control may be manual or automatic, the only requirement being the proper sequential connection of the fluid pressure source to the several lines 94.

Fig. 4 shows in chart form a preferred order for the operating sequence of the control means in housing 90 of Fig. 3. The six columns of the chart correspond to the six fluid ports on the actuator unit shown in Fig. 2, and the columns are so identified. The rows indicate sequential steps or succeeding moments in time, first for movement of the elongate rods 24 to the left (in Fig. 2), and then to the right. A blank intersection between a column and a row indicates that no pressure is being applied at that instant, whereas a filled-in intersection indicates the application of the pressure supplied by the fluid pressure source 92 of Fig. 3.

Referring now to the operation of the actuator unit of the present invention, and with particular reference to Fig. 2 and Fig. 4, when the rod 24 is to be translated in incremental steps toward the left with respect to the stationary elements connected to member 28, a suitable starting point is the condition where ports 37, 39 and 41 receive fluid pressure. With the pressure thus applied, annular driving plate 46 will be forced to the right to abut against the grooved face 30 of rigid member 28. This serves to index clamping collet 70 at a suitable initial or fiducial point. The application of pressure to port 39 causes similar positioning of the driving plate 48, while pressure in port 41 urges plate 80 away from plate 78 (to the right) to effect a clamping action of the collet 72 on rod 24. This application of pressure to these latter two ports will normally be the result of the completion of the next preceding cycle of incremental movement in a sequence of such movements.

Pressure is next (step 2) applied to port 35 (with the conditions in ports 37, 39 and 41 remaining unchanged) to spread apart plates 74 and 76 and move camming sleeve 86 to the left to clamp collet 70 to rod 24. Pressure is now removed (step 3) from ports 37 and 41 and is applied to port 38 to pivot driving plate 46 to the left, advancing clamping collet 70 a corresponding distance to the left and carrying rod 24 through the same incremental movement. Next (step 4), pressure is also applied to port 41 to clamp collet 72 to rod 24. With the pressure next (step 5) being removed from port 35 and then (step 6) from port 38, the clamp at collet 70 is released, and movement of plate 46 back against face 30 of member 28 draws collet 70 back to its initial position, after which the cycle may be repeated to give sequential incremental motion of elongate rod 24 to the left (in Fig. 2) with respect to the stationary members including rigid member 28.

In order to advance rod 24 incrementally to the right as seen in Fig. 2, the sequential application of fluid pressure to the several ports is performed in much the same manner as that just described, but in the opposite sense, as shown in the lower portion of Fig. 4. The primary difference in the operation of the actuator unit of the invention with respect to the direction of travel of the elongate rod relative thereto is whether fluid pressure is applied (at the proper times) to port 38 or port 40. When port 38 is utilized, the rod 24 is incrementally moved toward the left, while application of fluid pressure to port 40 results in movement of the rod to the right.

The use of rigid member 28 thus provides a positive stop for the two driving plates 46 and 48, allowing motion thereof in only one direction (in each) away from the normal planar position, and thus preventing undesirable retrograde motion of the elongate rod 24 relative to the base member 10 of the machine tool.

As will be appreciated by those skilled in the art, one or more of the aforementioned sequential steps may be omitted in certain applications. For example, where the driving plates are sufficiently sturdy to return themselves to the indexed position next to the respective faces 30 and 32 of the rigid member 28, the application of fluid pressure to the ports 37 and 39 will not aways be necessary.

The invention has been described above in considerable detail, and particularly with reference to its application to the machine tool art wherein it is desired to achieve very small, accurately controlled linear increments of motion between the fixed base thereof and a movable bed or the like mounted thereon. However, it will be obvious to those skilled in the art that the invention is also applicable to other arts wherein it is desired to produce such small and accurately controlled increments of motion between two members. Of particular importance is the reproducibility of the precise increments of motion, both in the machine tool art and other arts as well. One of the obvious applications other than that shown and described herein is the precision measuring art, wherein the dimensions of a given object must be determined to a very close tolerance.

In many of the applications to which the apparatus of the present invention may be put, including the machine tool bed as described herein, it will often be desirable to provide additional means for moving the elongate rod through large increments of travel to effect a coarse feed. Once the relatively movable elements are positioned within a given range of the desired exact location, the coarse feed may be discontinued, and then the remainder of the positioning accomplished by the means described herein. For example, gross adjustments of the movable bed of the machine tool described herein may be achieved by means of the ordinary lead screw to position the bed as closely to the desired position as the fineness of the lead screw pitch will allow, then the linear actuator disclosed herein may be employed to effect the remaining final adjustment to the desired position relative to the base or other fixed portion of the tool.

In many instances, such a machine tool will be provided with a control system which includes means for measuring the dimension just produced in the workpiece by the preceding cut of the tool thereon, means for comparing this dimension with a standard or desired dimension for that particular portion of the workpiece, and means for applying the error signal, if any, comprising the output of the comparing means, to the motive power means which control the lead screw or other drive means. By means of such a control system, the workpiece is continuously gauged and compared with the desired shape or size for the finished product. As errors appear in the control system, the drive means which are employed to effect relative movement between the movable bed of the machine tool and the base or other stationary portion thereof are called upon to supply a small additional movement corresponding to the error dimension.

Quite often, the error signal will represent an error dimension somewhat smaller than the smallest increment of motion producible by the drive means and the lead screw. That is to say, the error dimension may be somewhat less than the spacing between threads on the lead screw, and may even be less than the small linear increment of movement produced by the smallest rotational adjustment of the lead screw that may conveniently be measured. Further, the minuteness of the available small incremental step which may be produced by a lead screw is affected by the usually present thin film of lubrication on the working surface of the screw thread, such film being of variable and indeterminate thickness. Since the actuator disclosed herein is capable of providing increments of movement much smaller than those generally obtainable from a lead screw or the like, this actuator provides an excellent fine feed for use in connection with a lead screw coarse feed.

Hence, the invention is not to be considered as limited to the particular details given, nor to the specific application to which reference has been made during the description of the apparatus, except insofar as may be required by the scope of the appended claims.

What is claimed is:

1. An apparatus for imparting relative incremental translation between an elongate rod or the like and a reference member, comprising a rigid annular member loosely encircling such elongate rod and being secured at its outer periphery to such reference member, said rigid member having a face substantially perpendicular to the axis of such elongate rod, interconnected grooves in said face communicating with a fluid port, an annular driving plate adjacent said rigid member and loosely encircling said elongate rod, one face of said driving plate normally being contiguous with said grooved face and being secured thereto in hermetically sealed relation near the outer periphery thereof, an annular hermetic sealing means engaging and extending between said grooved face and said one face at a position near the inner peripheries thereof, a first annular fluid-operated clamping means encircling said elongate rod and connected to said rigid member, a second annular fluid operated clamping means encircling said elongate rod and connected to said driving plate at the inner periphery thereof, and control means connecting said fluid port and said first and second clamping means to a source of fluid pressure in sequence.

2. An apparatus for imparting relative incremental translation between an elongate rod or the like and a reference member, comprising a reference member, a driving plate connected at a first portion of the periphery thereof to said reference member for limited pivotal motion in a direction substantially parallel to the axis of such elongate rod, a first clamping means connected to said reference member, a second clamping means connected to a portion of the periphery of said driving plate opposite to said first portion thereof, both of said clamping means being adapted to clamp such elongate rod, and control means connected to said first and second clamping means and to means for effecting such limited pivotal motion for actuating such means in sequence.

3. An apparatus for imparting relative incremental translation between an elongate rod or the like and a reference member, comprising a rigid annular member encircling such elongate rod and being secured at its outer periphery to such reference member, said rigid member having a pair of opposite faces substantially perpendicular to the axis of such elongate rod, interconnected grooves in each of said faces, a pair of fluid ports respectively communicating with the interconnected grooves on opposite faces of said rigid member, a pair of annular driving plates adjacent said rigid member and encircling said elongate rod on opposite sides of said rigid member, one face of each of said driving plates normally being contiguous with a respective one of said grooved faces and being secured thereto in hermetically sealed relation near the outer periphery thereof, an anular hermetic sealing means engaging and extending between each of said grooved faces and the respective faces of said driving plates at a position near the inner peripheries thereof, a first annular fluid-operated clamping means encircling such elongate rod and conected to a first of said driving plates at the inner periphery thereof, a second annular fluid-operated clamping means encircling such elongate rod and connected to the second of said driving plates at the inner periphery thereof, and control means connecting said fluid ports and said first and second clamping means to a source of fluid pressure in sequence.

4. An apparatus for imparting relative incremental translation in accordance with claim 3, and including a second rigid annular member disposed adjacent each of said driving plates on the side thereof opposite from said first-mentioned rigid member, said second rigid members each being hermetically sealed to the respective driving plates and providing a chamber thereagainst, and means for connecting each of said chambers to such source of fluid pressure under the control of said sequential control means.

References Cited in the file of this patent
UNITED STATES PATENTS

| | | |
|---|---|---|
| 2,843,974 | Butterworth et al. | July 22, 1958 |
| 2,843,975 | Kamm | July 22, 1958 |
| 2,843,976 | Silver | July 22, 1958 |